United States Patent
Tilahun et al.

(10) Patent No.: US 10,332,096 B2
(45) Date of Patent: Jun. 25, 2019

(54) WIRELESS COMMUNICATION BEACON AND GESTURE DETECTION SYSTEM

(71) Applicant: PAYPAL, INC., San Jose, CA (US)

(72) Inventors: Yoseph Tilahun, San Jose, CA (US); Jan Rosen, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 841 days.

(21) Appl. No.: 14/810,353

(22) Filed: Jul. 27, 2015

(65) Prior Publication Data

US 2017/0032354 A1 Feb. 2, 2017

(51) Int. Cl.
G06Q 20/32 (2012.01)
G06Q 30/02 (2012.01)
H04W 40/24 (2009.01)

(52) U.S. Cl.
CPC ..... G06Q 20/3223 (2013.01); G06Q 30/0261 (2013.01); H04W 40/244 (2013.01)

(58) Field of Classification Search
CPC ............. G06Q 20/204; G06Q 30/0641; G06Q 30/0261; G06Q 10/0833; G06Q 30/0268; G06Q 20/3278; G06Q 20/322; G06Q 20/327; G06Q 30/0205; H04W 12/00508; H04L 67/22; H04B 17/318
See application file for complete search history.

(56) References Cited

U.S. PATENT DOCUMENTS

| | | | | |
|---|---|---|---|---|
| 8,792,862 B1* | 7/2014 | Juels | ...................... | H04W 12/06 455/411 |
| 8,934,940 B1* | 1/2015 | Juels | ................. | H04M 1/72577 455/414.1 |
| 9,032,498 B1* | 5/2015 | Ben Ayed | ............... | G06F 21/35 726/9 |
| 9,317,976 B2* | 4/2016 | Andrews | ............ | G07C 9/00571 |
| 9,326,226 B2* | 4/2016 | Bahram Pour | ......... | H04W 4/02 |
| 9,361,618 B2* | 6/2016 | Beadle | ............... | G07C 9/00007 |
| 9,378,494 B2* | 6/2016 | Syed | .................... | G06Q 20/325 |
| 9,589,263 B2* | 3/2017 | Griffin | ................. | G06Q 20/385 |
| 9,652,759 B2* | 5/2017 | Chitilian | ............ | G06Q 20/3224 |
| 9,717,108 B2* | 7/2017 | Raj | ......................... | H04L 67/12 |
| 9,947,003 B2* | 4/2018 | Clark | ................. | G06Q 20/3221 |
| 10,127,542 B2* | 11/2018 | Syed | .................. | G06Q 20/327 |
| 10,134,032 B2* | 11/2018 | Govindarajan | ...... | G06Q 20/382 |
| 2008/0139306 A1* | 6/2008 | Lutnick | .................. | G06Q 30/02 463/30 |
| 2011/0251954 A1* | 10/2011 | Chin | ................... | G06F 3/04883 705/40 |
| 2011/0273380 A1* | 11/2011 | Martin | ............... | G06F 3/04883 345/173 |
| 2012/0254032 A1* | 10/2012 | Carbonell Duque | ...................... | G06Q 20/3278 705/44 |

(Continued)

OTHER PUBLICATIONS

"PayPal announces PayPal Beacon for hands free payment", CIOL Bengaluru, Sep. 10, 2013, pp. 1-2. (Year: 2013).*

(Continued)

*Primary Examiner* — Mohammad Z Shaikh
(74) *Attorney, Agent, or Firm* — Haynes and Boone, LLP

(57) ABSTRACT

A secure payment system and method for enabling transactions with a merchant without communicating account or payment information to the merchant by using broadcasting beacon and a payment system which may create a user experience similar to NFC tap payment systems without using NFC communications.

20 Claims, 7 Drawing Sheets

(56) References Cited

U.S. PATENT DOCUMENTS

| | | | |
|---|---|---|---|
| 2013/0066749 A1* | 3/2013 | Cooke | G06F 3/017 705/27.2 |
| 2013/0124346 A1* | 5/2013 | Baldwin | G06Q 20/322 705/16 |
| 2013/0191789 A1* | 7/2013 | Calman | G06F 3/017 715/863 |
| 2014/0279508 A1* | 9/2014 | Karamchedu | G06Q 20/3224 705/44 |
| 2014/0370863 A1* | 12/2014 | Proctor, Jr. | H04W 4/029 455/414.3 |
| 2015/0019432 A1* | 1/2015 | Burns | G06Q 20/3278 705/44 |
| 2015/0081474 A1* | 3/2015 | Kostka | H04W 4/21 705/26.8 |
| 2015/0120475 A1* | 4/2015 | Pedley | G06Q 20/201 705/20 |
| 2015/0186874 A1* | 7/2015 | Govindarajan | G06Q 20/382 705/65 |
| 2015/0199672 A1* | 7/2015 | Woloshin | G06Q 20/3224 705/39 |
| 2015/0332248 A1* | 11/2015 | Weksler | G06Q 20/3226 705/71 |
| 2015/0356610 A1* | 12/2015 | Ponoth | G06Q 10/087 705/14.58 |
| 2015/0373762 A1* | 12/2015 | Raj | H04L 67/12 370/329 |
| 2015/0379506 A1* | 12/2015 | Griffin | G06Q 20/385 705/44 |
| 2016/0019512 A1* | 1/2016 | Buchheim | G06Q 20/227 705/73 |
| 2016/0044450 A1* | 2/2016 | Huh | H04W 4/02 455/456.3 |
| 2016/0055474 A1* | 2/2016 | Syed | G06Q 20/325 705/39 |
| 2016/0063476 A1* | 3/2016 | Baldie | G06Q 20/327 705/44 |
| 2016/0063576 A1* | 3/2016 | Paterson | G06Q 30/0276 705/14.72 |
| 2016/0092859 A1* | 3/2016 | Klingen | G06Q 20/027 705/44 |
| 2016/0092943 A1* | 3/2016 | Vigier | G06Q 30/0281 705/346 |
| 2016/0092966 A1* | 3/2016 | Vigier | G06Q 30/0633 705/26.8 |
| 2016/0094946 A1* | 3/2016 | Keithley | H04W 4/023 455/456.3 |
| 2016/0140541 A1* | 5/2016 | Pearson | G06Q 20/363 705/14.27 |
| 2016/0171486 A1* | 6/2016 | Wagner | G06Q 20/12 705/39 |
| 2016/0283056 A1* | 9/2016 | Kaminosono | G06Q 30/02 |
| 2016/0292784 A1* | 10/2016 | Granbery | G06Q 20/10 |
| 2017/0006434 A1* | 1/2017 | Howe | H04W 4/04 |
| 2017/0148060 A1* | 5/2017 | Showers | G06Q 30/0261 |

* cited by examiner

US 10,332,096 B2

WIRELESS COMMUNICATION BEACON AND GESTURE DETECTION SYSTEM

BACKGROUND

Field of the Invention

The present invention generally relates to wireless beacons and more specifically to conducting transactions based on communications between a mobile user device and a wireless communication beacon.

Related Art

Merchants often use electronic systems in conjunction with a user device to conduct electronic transactions for goods and services. For example, some merchants have a magnetic strip reader as part of a point of sale (POS) system. A consumer to transfer funds to purchase goods or services may slide a credit card (user device) through the reader to provide account information for a payment institution. The POS system may, using the account information, communicate with a related financial institution to conduct a monetary transfer and complete the transaction.

Similarly, with the advent of near field communication (NFC) devices, other electronic devices can perform the functions of a credit card without a magnetic strip. For example, a smartphone with NFC capabilities may wirelessly communicate account information to a POS system through NFC communications rather than a magnetic strip.

However in the above examples, both systems involve the transfer of account information from the user device to the POS system for use by the POS system in conducting an electronic payment. By using a system that transfers sensitive information between the user device and merchant device, the system is vulnerable to having the account information intercepted during the transfer. For example, a second magnetic strip reader/NFC reader may intercept account information from the user device while the user device is being used. Additionally, in some cases, these POS system may store the user account information in a database which can be stolen if the database is not sufficiently secure. Reducing the number of times sensitive information is exchanged and the number of parties that receive the sensitive information would increase the security of the payment system. Thus a payment system which does not require the transfer of account information to the merchant or merchant device would be more secure and desirable. Furthermore, it would be desirable for a payment system to be more secure without compromising usability and convenience.

Additionally, in some cases, a user device may lack an NFC communications module and/or may limit applications that can use the NFC application. Thus a system that allows for user devices without NFC capabilities to conduct payments using wireless communications would also be desirable.

Figure 1:
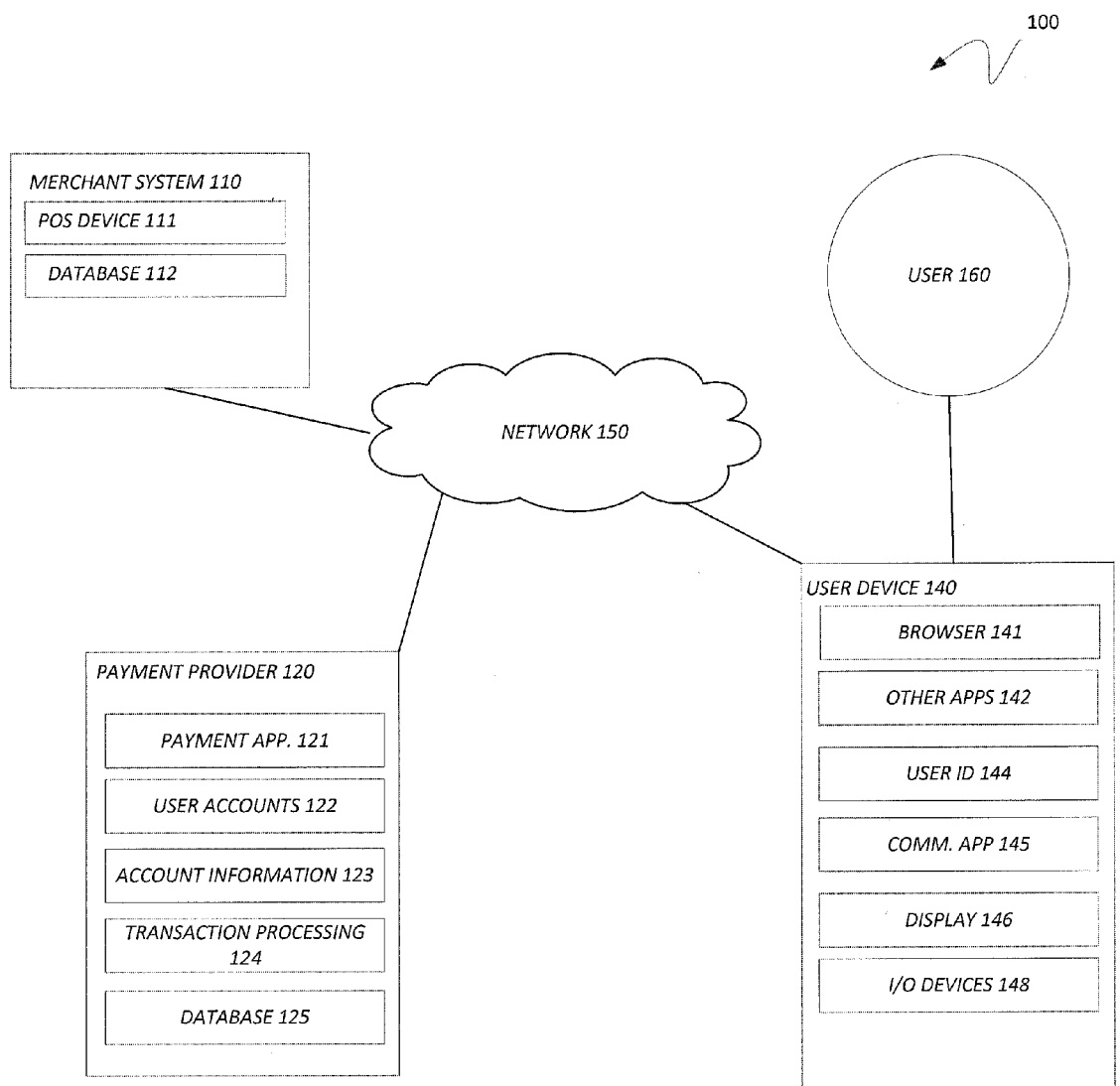
FIG. 1 is a block diagram of an illustrative networked system suitable for enabling secure monetary transactions using a wireless communications beacon.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a secure purchasing system is implemented with a wireless broadcasting device (e.g., a beacon) such that purchases by a consumer are possible without the consumer providing information to a merchant system or using NFC capability. In some embodiments, a computing system such as a merchant system receives or generates a transaction identifier that is related to a transaction for a consumer. If the transaction identifier is received, it may be received from a payment provider system over a network, such as the internet. If the transaction identifier is created by the merchant system, the identifier may be communicated to payment provider system using a network, such as the internet. In some embodiments, the computing system may communicate information about a transaction to the payment system that is associated with the transaction identifier. The information about the transaction may be information such as the goods or services being purchased in the transaction, an identifier for the merchant, and other information about the transaction. The system may be coupled with a broadcasting device, and the broadcasting device may broadcast the transaction identifier wirelessly and publicly such that consumer user devices are able to intercept the transaction identifier. In some embodiments, the broadcasting device is a beacon that is unidirectional broadcaster. The broadcaster may be configured for short range wireless broadcasting and may use an energy efficient wireless communications technology such as Bluetooth Low Energy or BLE. In some embodiments, the transaction identifier may include a universal unique identifier code which may indicate the user device applications that the broadcast is meant to interact with.

In some embodiments, the transaction identifier may be associated with the incentives such as coupons, gift cards, discounts, prizes, gifts, and/or the like. In some examples, the payment provider system or merchant system may associate the incentives with the identifier. The payment and/or merchant system may apply/provide the incentive upon a user conducting a purchase using the transaction identifier.

In some embodiments, the incentive may be broadcast by a beacon with the transaction identifier to a user device to store and/or use with a purchase. In some embodiments, the incentive may be tied to the transaction identifier such that the incentive is unlocked upon a purchase conducted with the transaction identifier. The incentives may be provided to entice consumers to purchase products using the payment system associated with the beacon.

In some embodiments, the beacon may be a bidirectional communicator that can communicate with a user device and provide a transaction identifier to the user device. In some examples, the transaction identifier may be provided to the user device upon a communication channel being established between the beacon and user device. The merchant system and/or beacon may be able to differentiate from multiple user devices based on a media access controller (MAC) address, IP address, and/or other identifiers for the user devices. In some embodiments the transaction identifier may be sent to the user device upon a request for from the user device. In some examples, the communication established between the user device and the beacon may be an encrypted communication channel.

In some examples, the merchant system may have a motion detector for detecting motion near a beacon. Some examples of motion sensors include but are not limited to passive infrared sensors, ultrasonic motion detectors, and/or the like. The motion detecting device may be used to detect that a user is conducting a tapping motion, waving motion, or another gesture near the beacon. In some example, the transaction identifier may be broadcast from the beacon upon the motion detecting device detecting the gesture. In some examples, the beacon may broadcast using a weak signal such that when a device is too far from the beacon, the user device will detect the broadcast. In some examples the weak signal may be configured so that user devices right next to or touching the beacon receive the broadcasts. In this manner the motion detection and weak signal act as a failsafe against unintended devices receiving the broadcasted transaction identifier.

In some embodiments, a user device of a consumer, such as a smart phone or a smart watch, may intercept the broadcast of the transaction identifier from the broadcasting device. In some embodiments, the user device may recognize that the transaction identifier is directed towards a particular application installed on the user device. The application on the user device may be a payment application. In some embodiments, the application may detect a certain gesture, such as a waving gesture or a tap motion, and begin receiving or listening for beacon broadcasts that are directed towards the application. In this manner, the user device can reduce energy consumption by not continuously searching for beacon broadcasts. In some embodiments, the application may begin listening for beacon broadcasts when the user device is in a certain location, such as within a store. The location may be determined through GPS on the phone and/or other geolocation determining methods. The application may maintain a database of GPS locations and check to see if the user device is within a certain threshold distance from those GPS locations to determine that the user is close to a beacon.

In some embodiments, the application on the user device may receive electronic data broadcast from the broadcasting device and detect/process a user input through the user device indicating that the user would like to complete a transaction. The user input may be a gesture performed with the user device and the gesture may be detected by a motion sensing device or a combination of motion sensing devices such as an accelerometer, gyroscope, or the like. Each gesture may be represented by a set of accelerometer, gyroscope, gps, and other motion detection readings detected by the user device. In this manner, gestures can be compared by comparing sensor readings.

An application on the user device, upon receiving a transaction identifier through a broadcast and detecting the gesture, may cause the user device to send the transaction identifier and user account information to a payment provider system. In some embodiments, the application on the user device may also cause the user device to request other information from the user, such as a confirmation that the user authorizes conducting a purchase that is associated with the transaction identifier. In some embodiments, the application may also cause the user device to collect authentication information from the user, such as one or more of the following: a biometric signature, user account information, passwords, and other authenticating information. In some embodiments, to prevent false positive gesture detections for a transaction identifier, the user device may determine the distance of the broadcasting device based on the signal strength of the broadcasting signal. The user device may ignore or treat broadcasts that the user device determines is from a device beyond a distance threshold as if the broadcast was never received.

In some embodiments, the application may cause the user device to send the transaction identifier and account information to a payment provider system upon receiving or detecting one or more of the following: a transaction identifier, a user gesture, account password, biometric signature, a confirmation of the transaction, a distance of the broadcasting device to the user device which is below a threshold value and/or the like.

In some embodiments, the payment system may generate a transaction identifier or receive the transaction identifier from the merchant system discussed above. If the payment system generates the transaction identifier, the payment system may send it to the merchant system or a beacon associated with the merchant system for broadcasting. The payment system may receive transaction information for the merchant system and associate it the transaction identifier.

The payment system may also receive the transaction identifier from a user device. In some embodiments, the payment system may also receive account information or information that associates the user device with an account on the payment system. The payment system may also receive authentication information from the user device. The payment system may use the authentication information to authenticate the use of the user device with an associated account. The payment system may match the transaction identifier from the user device with the transaction identifier received from the merchant device or generated by the payment system. The payment system may complete the transaction associated with the transaction identifier by conducting a funds transfer between an account for the user and an account for the merchant. The payment system may also relay information from the merchant system to the user device about the transaction, such as the goods or services that are being purchased, the price, the merchant, and/or other transaction information. The payment system may also send a receipt to the user when the transaction is completed. In some embodiments, the merchant system sends a receipt to the user.

In some embodiments, a system for secure payment processing includes a user device with a processor. The user device may have an application configuring the processor to perform the steps of receiving a transaction identifier broadcast by a wireless beacon, detecting a gesture performed by a user with the user device, and communicating the transaction identifier to a payment provider over a network in response to receiving the transaction identifier and detecting the gesture.

In some embodiments, a system for secure payment processing includes a merchant system with a wireless beacon. The merchant system may be configured to perform the steps of broadcasting a transaction identifier using the wireless beacon and sending the transaction identifier to a payment provider. The system may also include a user device with a processor configured to perform the steps of receiving the transaction identifier broadcast by the wireless beacon, detecting a gesture performed by a user with the user device, and sending the transaction identifier to the payment provider over the internet in response to receiving the transaction identifier and detecting the gesture.

In some embodiments, a system for secure payment processing includes a server including one or more processors coupled to a memory and operable to read instructions from the memory to perform the steps of receiving information related to a transaction including a purchase value from a merchant system, associating an identifier for the transaction, sending the identifier to a wireless beacon of the merchant system for broadcasting, receiving the identifier for the transaction and an account identifier from a user device, and transferring funds from an account associated with the account identifier equal to the purchase value to a merchant account.

Some of the benefits of the system described herein are that the user device does not transfer user information and/or account information to the merchant. The user device may communicate directly with a payment provider. This creates a more secure payment system. The transaction identifier is used for the payment system to identify which transaction a user device is conducting a payment for. Additionally using a wireless broadcasting device in combination with a gesture creates the ability to have a system that acts like an NFC style purchase without actually using NFC communications.

While the various examples disclosed herein focus on particular aspects regarding conducting secure payment transactions using a wireless broadcasting device, it will be understood that the various inventive principles and embodiments disclosed herein can be applied to other types of arrangements as well. For example, different user devices other than a smart phone may be used to conduct transactions, such as a smart watch and/or other wearable devices.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium may have computer readable and executable code for instructing one or more processors to perform any of the methods disclosed herein.

Beginning with FIG. 1, a block diagram is shown of a networked system 100 suitable for implementing one or more processes for enabling secure transactions using a broadcasting device. Networked system 100 may comprise or implement a plurality of servers and/or software components that operate to perform various electronic commerce transactions or processes such as payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a merchant system 110, a payment provider server 120, and a user device 140 in communication over one or more networks within network 150. A user 160, such as a consumer, may utilize device 140 to interact with other devices such as, merchant system 110, payment provider server 120, and/or third-party server 130.

Merchant system 110 may be maintained, for example, by a merchant, seller, or a marketplace offering various products and/or services. Merchant system 110 may be set up to handle payments at a brick and mortar store selling goods and/or services. For example, merchant system 110 may be set up for a grocery store, gas station, convenience store, department store, mall, clothing store, and/or the like.

Merchants system 110 may be in communications with and/or linked with a payment provider, such as payment provider server 120, to conduct currency transfers when a product is purchased. Generally, merchant system 110 may be maintained by anyone or any entity that receives money, which includes charities as well as banks and retailers.

Merchant system 110 may also include a point of sale (POS) device 111 which may be configured to facilitate the purchase by user 160 of goods or services with user device 140. POS device 111 may be configured to accept payment information from or on behalf of user 160 through payment service provider server 120 over network 150 and/or user device 140. In some embodiments, POS device 111 may send and/or receive information to and/or from user device 140 in manners other than through network 150, for example through wireless broadcasting devices, such as beacons, and/or the like. In some embodiments, POS device 111 may have bi-directional communication capability over network 150 and have a uni-directional wireless broadcaster to send information to user devices within broadcasting range. POS 111 may broadcast using a short-range wireless communication standard such as Bluetooth, Bluetooth LTE, Wi-Fi, and/or the like. In some examples, POS 111 may broadcast data over multiple wireless communication standards.

In some examples, POS device 111 may receive and process a payment confirmation from payment provider server 120, as well as transmit transaction information to the payment provider and receive information from the payment provider (e.g., a transaction ID) using network 150. POS device 111 may also be configured to receive payment via a plurality of payment methods including cash, credit cards, debit cards, checks, money orders, and/or the like.

In some embodiments, merchant system 110 may have a database 112 which may include information regarding merchant products and/or user accounts. Database 112 may maintain an inventory of products available for sale, donation, exchange, and/or the like. Products may include, but are not limited to, physical goods, digital goods, services, commodities, charities and/or the like (products may also be referred to as items). Database 112 may contain product descriptions which may include textual descriptions of products, information regarding the merchant (e.g. merchant name, location, type, etc.), receipts for purchases, and/or the like.

Payment provider server 120 may be maintained, for example, by an online payment service provider which may provide payment between user 160 and the operator of merchant system 110, another user, and/or a merchant. Payment provider server 120 may include one or more payment applications 121 which may be configured to interact with merchant system 110 and/or user device 140 over network 150 to facilitate the purchase of goods and/or services, communicate/display information, and send payments by user 160 of user device 140.

Payment provider server 120 may also maintain a plurality of user accounts 122, each of which may include account information 123 associated with consumers, merchants, and funding sources, such as banks and/or credit card companies. For example, account information 123 may include private financial information of users of devices such as account numbers, passwords, device identifiers, user names, phone numbers, credit card information, bank information, place of residence, mailing addresses, shipping locations, and/or other information which may be used to facilitate transactions by user 160. Payment application 121 may be configured to interact with merchant system 110 on behalf of user 160 during a transaction with POS device 111 to track and manage purchases made by users and which funding sources are used. Payment application 121 may be configured to determine the existence of and to manage accounts for user 160, as well as create new accounts if necessary. Payment application 121 may be configured to execute one or more payment transactions in response to receiving and/or recognizing a purchase request from user 160, device 140, and/or merchant system 110.

A transaction processing application 124, which may be part of or separate from payment application 121, may be configured to receive information from user device 140 and/or merchant system 110 for processing and storage in a database 125. Transaction processing application 124 may include one or more applications for processing payment information from user 160 and/or merchant system 110 using various selected funding instruments. As such, transaction processing application 124 may store details of an order from individual users, including a funding source used, available credit options, and/or the like. Transaction processing application 124 may be configured to execute one or more transactions in response to a user purchasing in conjunction with merchant system 110.

In some embodiments, payment provider server 120 may be maintained by a payment service provider, such as PayPal, Inc. of San Jose, Calif. A user 160 may utilize user device 140 to initiate a payment transaction, receive a transaction approval request, and/or reply to a transaction approval request. Note that transaction, as used herein, refers to any suitable action performed using the user device, including payments, transfer of information, display of information, purchases, sales, online listings, and/or the like.

User device 140, merchant system 110, and payment provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Network 150 may be implemented as a single network or a combination of multiple networks. For example, in various embodiments, network 150 may include the Internet or one or more intranets, landline networks, wireless networks, other appropriate types of networks and a combination thereof.

User device 140 may be implemented using any appropriate hardware and software. For example, in one embodiment, user device 140 may be implemented as a personal computer (PC), a smart phone, personal digital assistant (PDA), laptop computer, smart watch, and/or other types of computing devices capable of transmitting, receiving, creating, and/or displaying machine-readable data, such as an iPhone™ from Apple™.

User device 140 may include one or more browser applications 141 which may be used, for example, to provide a convenient interface to permit user 160 to view a webpage. In some examples, browser application 141 may be implemented as a web browser configured to view and/or interact with a webpage provided by payment provider 120 to set up an account and/or change account settings.

User device 140 may further include other applications 142 as may be desired in particular embodiments to provide desired features to user device 140. For example, other applications 142 may include security applications for implementing client-side security features, programmatic client applications for interfacing with appropriate APIs over network 150, or other types of applications.

Applications 142 may also include applications for browsing content, which may include applications for email, texting, voice, IM, and/or the like. Applications 142 may allow user 160 to send and receive emails, calls, and texts. Applications 142 may enable user 160 to play games, read digital books, communicate, transfer information, make payments, and/or the like.

User device 140 may include one or more user identifiers 144 which may be implemented, for example, as operating system registry entries, user identifiers associated with hardware of user device 140, and/or other appropriate identifiers, such as used for payment, user, and/or device authentication. In some embodiments, user device 140 may include a communications application 145 with associated interfaces that enables user device 140 to communicate within system 100. In some embodiments, user identifier 144 may be information that may be used by a payment service provider to associate user 160 with a particular account maintained by the payment provider.

Display 146 may include a screen that displays information and/or content to user 160. Display 146 may be a mobile device display, monitor, e-ink display, projection display that projects images onto a transparent, partially transparent or opaque structure, or may include any other suitable display technologies.

User device 140 may include one or more input/output devices 148 (e.g., a keypad, a keyboard, a touch sensitive component, a microphone, a camera, gyroscope, accelerometer, and the like). In some examples, display 146 may be a touch screen that doubles as one of the input/output devices 148. User device 140 may monitor user input on the touch screen, on any other touch-sensitive device (e.g., a touchpad on a laptop), and/or other input components (e.g., a accelerometer) and may recognize user input for association with transactions, and/or to activate actuatable elements for certain functions (e.g., purchase transactions, payment transactions, sales transactions, and listing transactions).

One or more of merchant system 110, payment provider server 120, and user device 140 may be used to execute any suitable transaction in response to user 160 indicating a desire to purchase a product.

Figure 2:
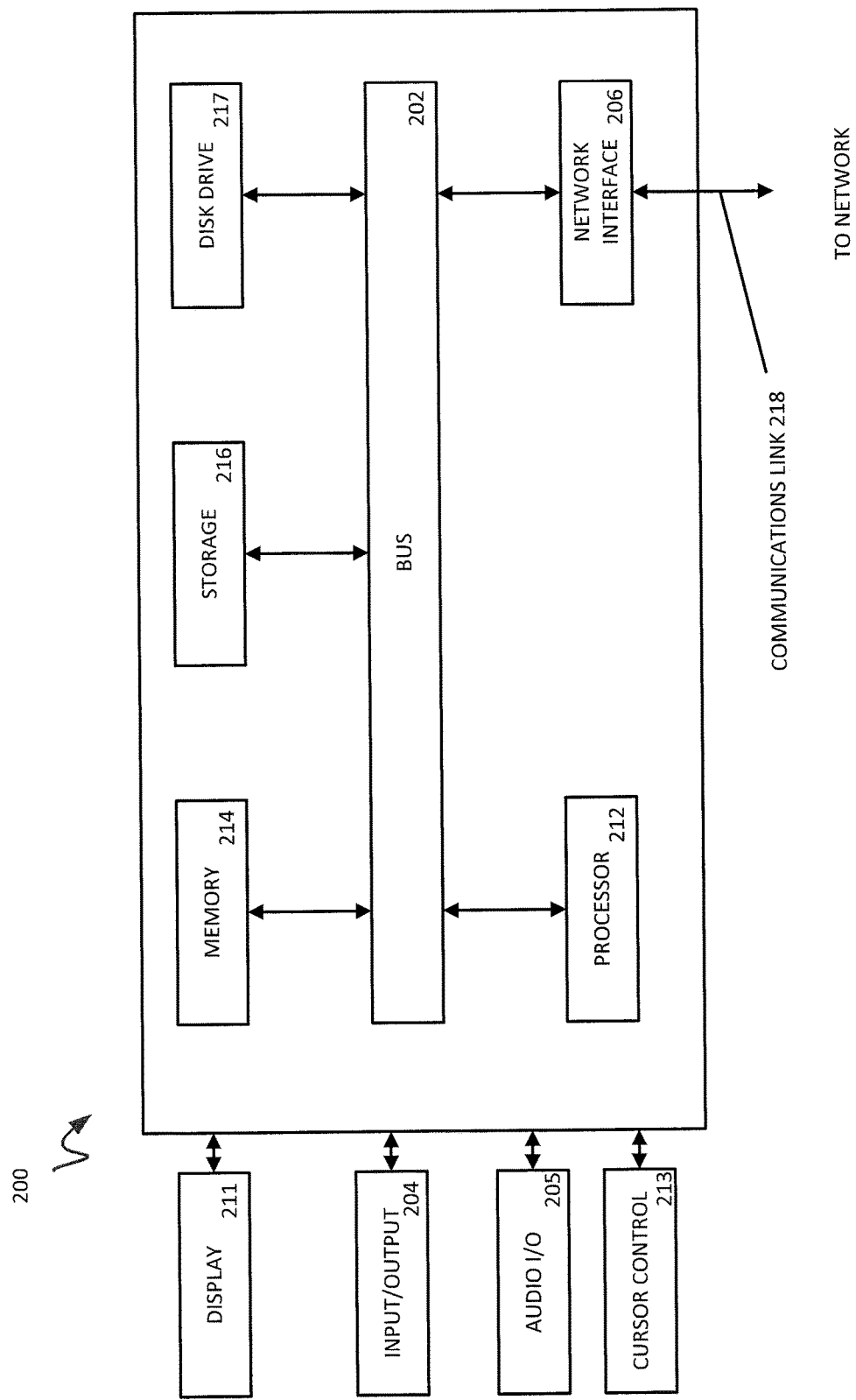
FIG. 2 is a block diagram of an illustrative computer system suitable for implementing one or more components in FIG. 1.

FIG. 2 is a block diagram of a computer system 200 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant, third-party server, and/or payment provider may utilize a network computing device (e.g., a network server) capable of communicating with the network. It should be appreciated that each of the devices utilized by users, merchants, and payment providers may be implemented as computer system 200 in a manner as follows.

Computer system 200 includes a bus 202 or other communication mechanism for communicating information data, signals, and information between various components of computer system 200. Components include an input/output (I/O) component 204 that processes a user action, such as selecting keys from a keypad/keyboard, selecting one or more buttons or links, performing a gesture, etc., and sends a corresponding signal to bus 202. Some exemplary I/O components may include an accelerometer, gyroscope, fingerprint reader, optical sensors, camera, and/or the like. I/O component 204 may also include a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 may transmit and receive signals between computer system 200 and other devices, such as another user device, a merchant server, or a payment provider server via a network. In one embodiment, the transmission is wireless, although other transmission mediums and methods may also be suitable. A processor 212, which can be a micro-controller, digital signal processor (DSP), or other processing component, processes these various signals, such as for display on computer system 200 or transmission to other devices via a communication link 218. Processor 212 may also control transmission of information, such as cookies, IP addresses, and/or instructions to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or electromagnetic waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 3:
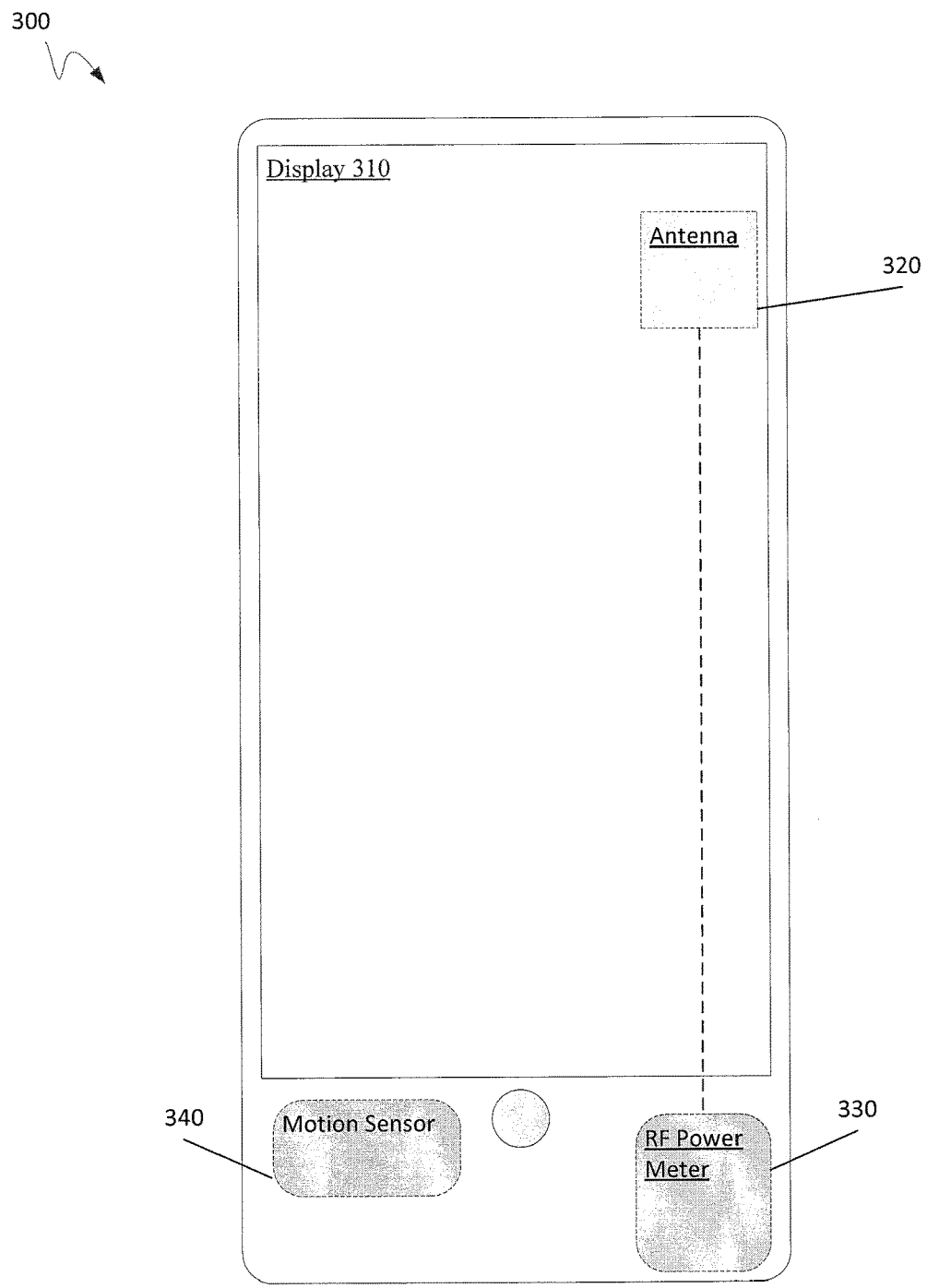
FIG. 3 is a simplified illustration of an exemplary user device for implementing one or more embodiments of a secure monetary transaction system using a wireless communications beacon.

FIG. 3 is a simplified illustration of a user device 300 suitable for implementing one or more embodiments of the present disclosure. In various implementations, user device 300 may comprise a personal computing device (e.g., smart phone, computing tablet, personal computer, PDA, etc.). In some embodiments, user device 300 may be a computer system such as computing system 200 of FIG. 2. Device 300 may have a display 310, which may be a touch screen display capable of detecting and receiving touch commands from a user. Device 300 may have a wireless communications antenna 320 which may, in conjunction with a receiver, transmitter, and/or transceiver, receive and/or transmit electromagnetic waves. Antenna 320 may be coupled to a radio frequency (RF) power meter 330 which may measure the strength of the electromagnetic waves antenna 320 intercepts. In some embodiments antenna 320 may be optimized to receive Bluetooth signals, Bluetooth Low Energy (LE) signals, WiFi Signals, cell phone signals, and/or other electromagnetic signals. In some embodiments, antenna 320 may be made of multiple antennas for different wireless communication frequencies.

In some embodiments, user device 300 may include a motion sensor 340 for detecting movement of device 300. Motion sensor 340 may be an accelerometer, gyroscope, high-accuracy global positioning system ("GPS"), and/or the like. In some embodiments, motion sensor 340 may be a combination of multiple motion detecting devices, such as an accelerometer and a gyroscope.

Figure 4:
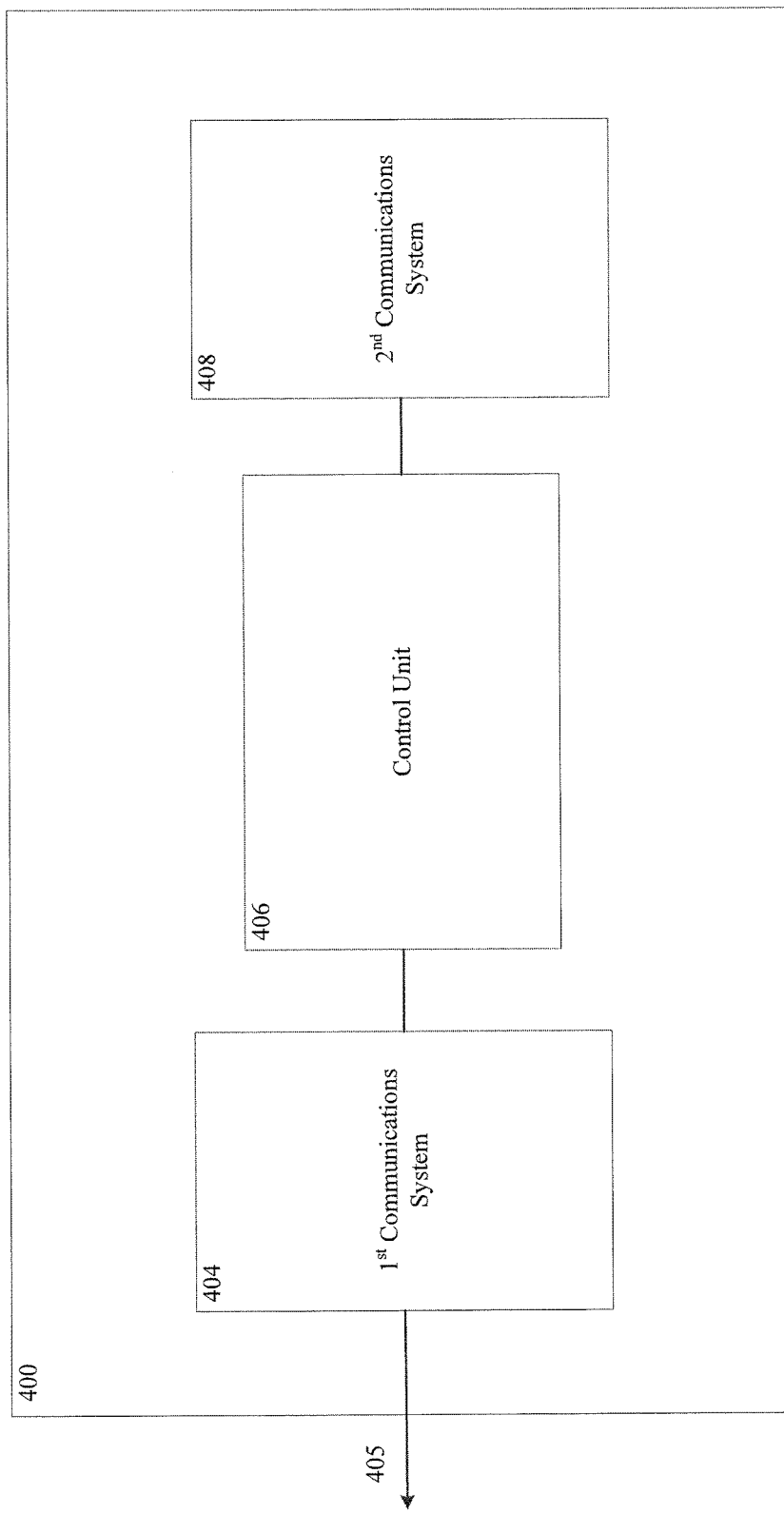
FIG. 4 is a simplified illustration of a broadcasting device which may be used as part of a system for enabling secure monetary transactions with a wireless communications beacon.

Referring now to FIG. 4, an exemplary embodiment of a broadcasting device 400 is illustrated. The broadcasting device 400 may include a first communications system 404 such as, for example, a WiFi communications system that may be connected to a network 405 such as a local area network (LAN), the internet, networks discussed in FIG. 1, and/or the like. The first communications system 404 may be coupled to a control unit 406 that may include instructions on a memory system (not shown) in the broadcasting device 400 that, when executed by a processing system (not shown) in broadcasting device 400, cause the processing system to perform the functions of the broadcasting device 400 discussed in this disclosure. The control unit 406 may be coupled to a second communication system 408 which may be wireless, such as a Bluetooth® Low Energy (BLE) communication system. In some embodiments the second communication system 408 may be a unidirectional wireless broadcaster. The control unit 406 may be configured to receive instructions from a merchant system or payment provider device, such as merchant system 110 and/or payment provider 120 of FIG. 1, using the first communication system 404 to broadcast data by second communication system 408. In some embodiments, communications device 400 may be configured to broadcast data wirelessly such that one or more devices within broadcasting range of second communication system 408 may receive the broadcasts. In some embodiments, the data that second communication system 408 broadcasts may be a configuration, code, unique identifier and/or the like. Broadcasting device 400 may be configured to broadcast within a limited range by reducing the broadcasting power of the device. In some embodiments, the broadcasting range of device 400 may be remotely controlled by a server, such as merchant server 110 and/or payment provider 120 discussed in FIG. 1.

While a few examples of communications components in the communications device 400 have been described, one of skill in the art will recognize that other communications devices, as well as other components that have been omitted for clarity of discussion, may be included in the broadcasting device 400 and will fall within the scope of the present disclosure. One of ordinary skill in the art will recognize that the components described above may allow for the communications device to be provided in a relatively small form factor such that it may be placed inconspicuously almost anywhere, such as next to a cash register or attached to a tablet computing device. In some embodiments, broadcasting device 400 may be fixed to a location to act as a beacon. In some embodiments, broadcasting device 400 may be housed in a chassis and may include any of a variety of features that allow for the coupling of the broadcasting device to different areas in a physical location. In some embodiments, broadcasting device 400 may be a personal digital assistant (PDA) device, a smart phone or any other multi-mode communications device.

In some embodiments, broadcasting device may be configured such that it may plug into an electrical plug or wall socket for receiving power to operate. In some embodiments, the broadcasting device may be configured to plug into another powering port, such as a universal serial bus (USB) port, for receiving power to operate.

Figure 5:
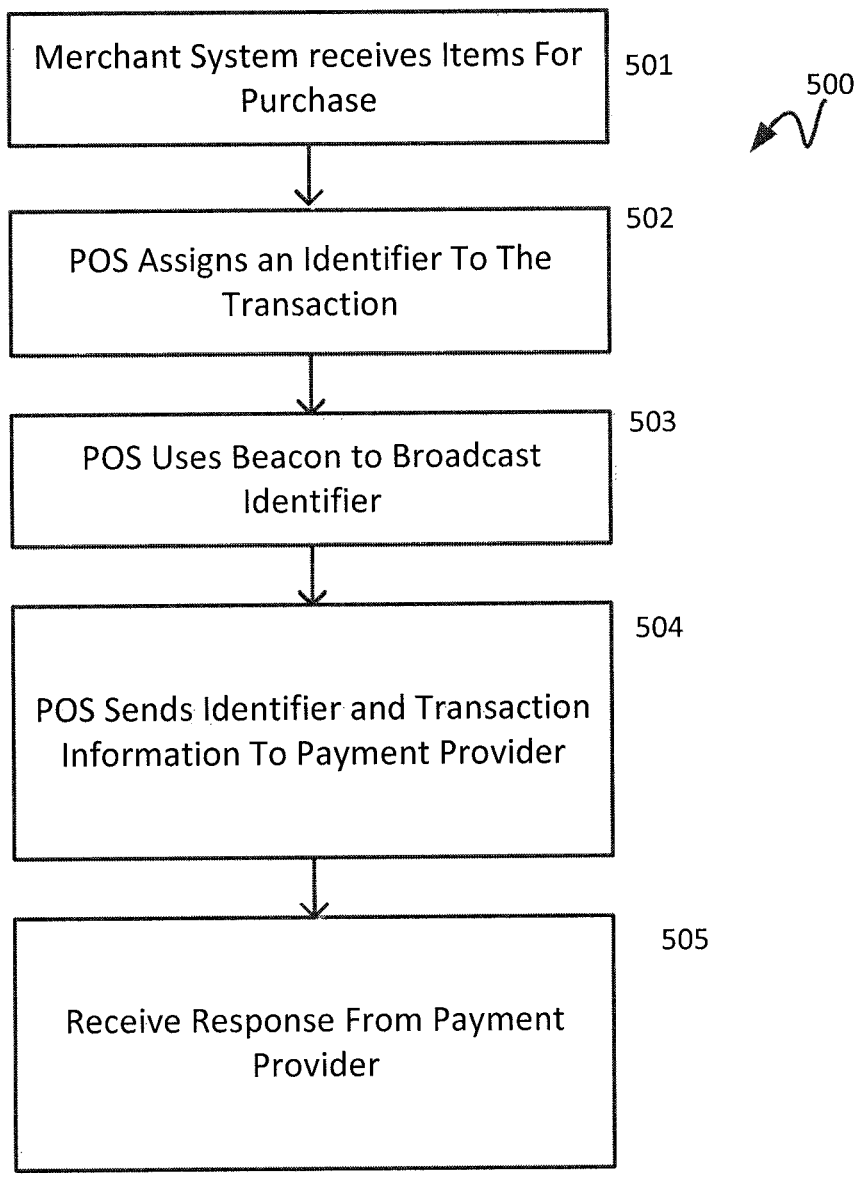
FIG. 5 is a simplified diagram of an exemplary method which may be implemented on a merchant system as part of a system for secure transactions using a wireless beacon.

FIG. 5 is a simplified diagram of a method 500 for secure transactions using a wireless beacon which may be implemented by a merchant system or POS device. In some embodiments, method 500 may be implemented by or part of a system such as system 100 and/or merchant system 110 of FIG. 1. According to some embodiments, method 500 may include one or more of the processes 501-504 which may be implemented, at least in part, in the form of executable code stored on a non-transitory, tangible, machine readable media that when run on one or more processors (e.g., the processor 212 of FIG. 2) may cause the one or more processors to perform one or more of the processes 501-505.

At process 501, a merchant system, such as merchant system 110 of FIG. 1, may receive product identifiers for goods and/or services a consumer is intending to buy. In some examples, the merchant system may have a POS device coupled to a barcode scanner and receive the identifiers from the barcode scanner when then a barcode image is placed in front of the barcode scanner. In some embodiments, the product identifiers may be received when a user manually enters the product identifier through an input device, such as a keyboard.

In some embodiments, the merchant system may use the product identifier to reference a database that associates the product identifier to information about the product, such as a name for the product, a price for the product, coupons for products, discounts, and/or other information related to the product. The merchant system may use the associated information to initiate a transaction. In some embodiments, the merchant system may document information about the transaction, such as a list of products the consumer is planning to purchase, the price of each product, a cumulative price total for all the products in the transaction, time stamp for when the transaction was initiated and/or completed, coupons being applied, application of discounts for products, taxes for the products, and/or the like.

At process 502, the merchant system may assign an identifier to the transaction initiated in process 501. In some embodiments, the identifier may be generated by the merchant system. In some embodiments, the identifier may be provided to the merchant system bay another system, such as a payment provider system. In some examples, the other system may provide the identifier to the merchant system in response the merchant system communicating transaction information to the other system.

In some embodiments, the identifier may be a sequence of numbers that may be used to reference a particular transaction. In this manner, computing devices such as merchant system 110, user device 140, and/or payment provider 120 of FIG. 1 may use the identifier to differentiate one transaction from another. For example, the merchant system may have multiple POS devices which different consumers may be able to interact with to conduct a transaction. The merchant system may initiate a new transaction for each POS device based on indications that a new transaction has begun or has been completed and each new transaction may be assigned an identifier. As another example, a payment provider may handle multiple transactions for multiple entities and use an identifier to distinguish each of the multiple transactions.

In some embodiments, the transaction identifier may be a unique identifier. The unique identifier may be unique for a time period, such as a few hours or days, and may be reused after the time period expires. In some embodiments, the unique identifier may be in rotational use after all other identifiers have been used. For example, the unique identifier may be the number 2 used in rotation of identifiers from 1-10, and the number 2 may be reused after 3-10 and 1 have been used as identifier after the number 2.

In some embodiments, the transaction identifier may also include information that may aid users in determining whether the transaction identifier pertains to a transaction the user is conducting. For example, the transaction identifier may indicate which POS device is being used for the transaction, such as a checkout stand number. In some examples the transaction identifier may also indicate which merchant the transaction is being conducted with.

In some embodiments, the transaction identifier may also include an application identifier such that an application that is configured to be paired with or work with the merchant system may recognize that the broadcast is intended for the paired application. For example, the application identifier may be a universally unique identifier (UUID).

In some embodiments, the transaction identifier may have a dynamic portion which changes over time. In some embodiments the transaction identifier may have a time stamp that indicates when the transaction identifier is created and/or when the identifier should expire. In this manner, a system using and/or receiving the transaction identifier may be able to recognize whether the transaction identifier is still valid, and allow for the number used as the transaction identifier to be reusable at another time for another transaction.

At process 503, the merchant system may use a broadcasting device, such as a beacon, to wirelessly broadcast the transaction ID. The merchant system may broadcast the transaction ID through a Bluetooth signal, Bluetooth low energy signal, WiFi and/or other wireless communications methods. In some examples, the broadcasting device may have a one way wireless communication beacon for broadcasting data wirelessly. In some examples, the broadcasting device may broadcast location information, such as the geolocation of the broadcasting device. In this manner another device may be able to accurately calculate how far away the device is from the broadcasting device.

In some examples, the broadcasting device may be a dual mode communication device that can both send and receive wireless communications. In some examples the broadcasting device may be configured to send and receive signals with other devices, such as user device 140 of FIG. 1, such that the other devices can determine the distance between the broadcasting device and other devices. For example, the broadcasting device may be capable of relaying pings such that the other devices can calculate how far away the broadcasting device is based on the ping travel time. In some embodiments, a plurality of broadcasting devices may work in concert to triangulate the location of a device. In some embodiments the merchant system may use the a plurality of beacons to triangulate user devices with rapid pings for detecting user device movement with high resolution. In this manner the beacons, working in concert, gestures that users perform with the user device. In some examples, the broadcasting device may be able to calculate how far away the other devices are based on signal strength the broadcasting device receives from other devices. The broadcasting device may use the following equation for calculating distance to another device: distance=10^((27.55−(20*Log(frequency))+(signal strength))/20). In this equation, the signal strength is measured in decibel-milliwatts and the distance is measured in meters. The constant values within the above equation may change depending on the units used for distance, frequency, and signal strength. In some embodiments, the broadcasting device may communicate the calculated distance to the respective devices communicating with the broadcasting device, such as a user device or a payment device. In some embodiments, instead of distance or in combination with distance, signal strength may be used. In some embodiments, the distance determinations discussed above may be used in concert with other beacons to triangulate the position of the user device. The beacons could also poll signal strengths from user devices at rapid intervals to obtain high resolution motion detection of the user device. In this manner, the beacon may be able to detect whether a user preformed a gesture with the user device. The measured signal strength may be the received signal strength indicator (RSSI) that is measured by the wireless device.

In some embodiments, the beacon may dynamically change its signal strength. For example, the beacon may reduce signal strength when there are a lot of consumers, long lines, and/or densely populated areas. Conversely, the beacon may increase signal strength when consumers are sparse. In some examples, the merchant system may receive population information from one or more sensors at a door or checkout line. The sensors may be configured to determine whether someone is entering or leaving a building such that the merchant system can tally those indicators and estimate how many people have entered or left the store. Similarly, sensors can be used to determine how long a line is, the amount of foot traffic, the speed of foot traffic, and/or the like. In some embodiments, the merchant system may be able to predict times of days when the store is crowded or not. For example, 6 pm at a grocery store on a Saturday tends to be the most crowded while the store will likely be empty at 12 am on a Wednesday night. The merchant system may then dynamically change the signal strength of a beacon based on predictions on how crowded the store is, from sensors measuring the number of people within the store, and/or other metrics, which enables the system to more accurately communicate to intended consumers and not just ones walking by a beacon.

In some examples, the merchant system may dynamically change the signal strength of a beacon based how often multiple user devices receive the same transaction identifier. For example, several user devices may attempt to use the same transaction identifier with the merchant system or a payment provider, and the merchant system in response may reduce or the broadcasting signal strength that the beacon uses.

At process 504, the merchant system may send the transaction identifier and associated transaction information to a payment system of a payment provider, such as payment provider 120 of FIG. 1, over a network, such as network 150 of FIG. 1. In some embodiments, the merchant system may also send a merchant identifier to the payment system such that the payment system is able to identify an account associated with the merchant. The merchant identifier may be an account user name, a unique numerical value, email address, and/or other identifying information.

At process 505, the merchant system may receive a response to the information sent in process 504 from the payment provider. In some examples, the response may be an indication as to whether the transaction has successfully completed. For example, the indication may include a confirmation that the product or services related to the transaction have been paid for and/or the funds from a consumer account have been transferred to the merchant account. In some examples, the indication may include information such as any discounts or coupons that were used by the consumer to reduce the price of a product or service sold. In some embodiments, the beacon may send, to users in communication with the beacon, coupons, discounts, and other incentives of products that are near the beacon to incentivize a user to purchase some of those products. For example, the beacon may advertise and/or provide discounts for snacks that are on sale in the aisle near the beacon, such as a beacon at either end of the aisle.

In some examples, the merchant system may print a receipt or send a receipt to the consumer who conducted the purchase. For example, the merchant system may send the receipt to the email address of the consumer. This may be after the consumer provides their email address. In some examples, the receipt may be sent through a text message to a user device of the consumer. In some examples, the receipt may be sent to the payment provider for the payment provider to relay to the consumer.

Figure 6:
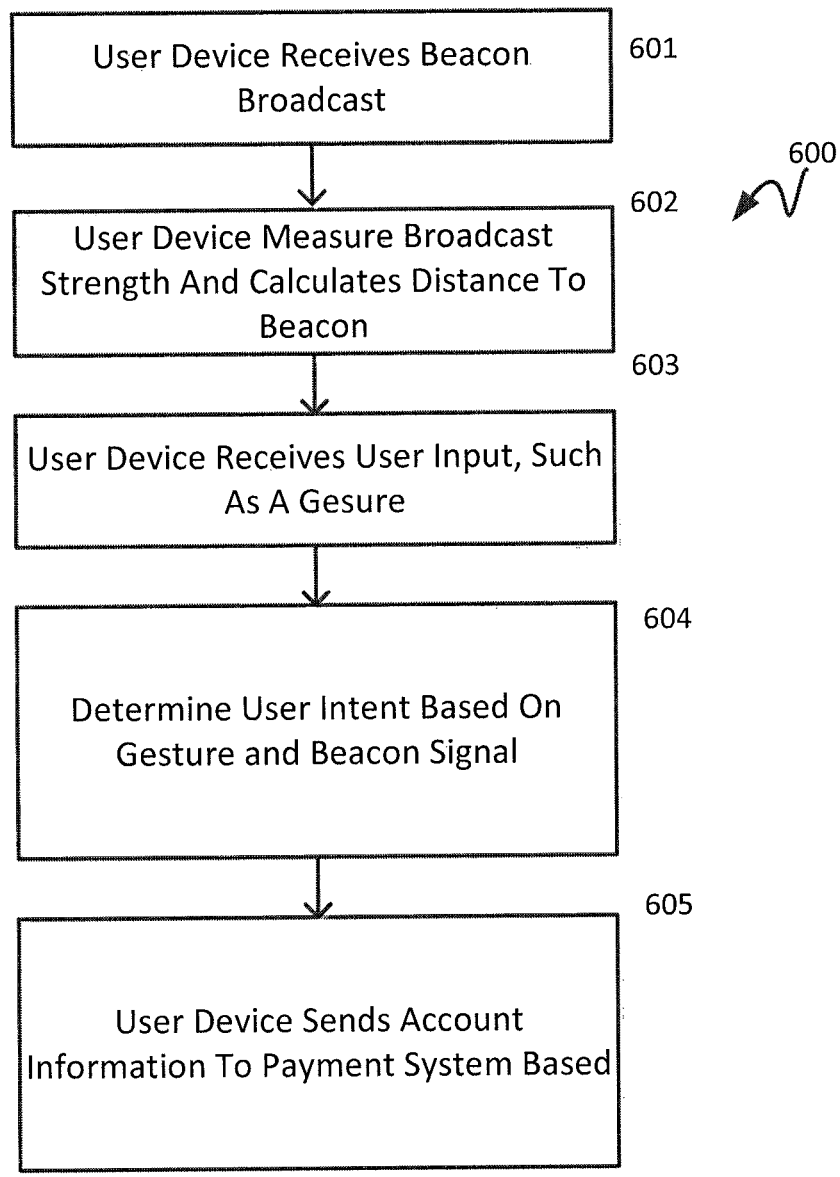
FIG. 6 is a simplified diagram of an exemplary method which may be implemented by a user device as part of a secure transaction system using a wireless beacon.

FIG. 6 is a simplified diagram of a method 600 which may be implemented by a user device as part of a secure transaction system using a wireless beacon. In some embodiments, method 600 may be implemented by or part of a system such as system 100 of FIG. 1. According to some embodiments, method 600 may include one or more of the processes 601-604 which may be implemented, at least in part, in the form of executable code stored on a non-transitory, tangible, machine readable media that when run on one or more processors (e.g., the processor 212 of FIG. 2) may cause the one or more processors to perform one or more of the processes 601-604.

At process 601, a user device may receive a beacon broadcast of a transaction identifier. In some embodiments, the broadcast may be the broadcast at process 503 of FIG. 5. The user device may monitor wireless broadcast and determine that the received transaction identifier is paired with or intended for an application implementing method 600 on the user device based on an application identifier, such as a UUID. The transaction identifier may include an alphanumeric value for identifying a related transaction. The transaction identifier may also include other information related to the transaction such as information regarding the specific POS system conducting the broadcast, checkout stand number, beacon number, and/or the like. In some embodiments, the transaction identifier may be a simple identifier that can be used to retrieve the other information related to the transaction from a payment provider or a merchant system. For example, the broadcast may be from a unidirectional beacon, and any communications with the merchant system may be through another network different from the wireless communication used in the broadcast. The other network may be the internet. In some embodiments, the user device may communicate with a payment provider system that the merchant system is also in communications with. In some embodiments, the payment provider system may act as a relay for communications between the payment provider system and the user device.

In some embodiments, the transaction identifier may be a bar code, QR code, or another optical machine readable representation of data. In this manner, a user may be able to add products to a transaction issuing the transaction identifier. For example, a merchant may have scanners next to different products and/or services for sale. The user device may display the optical machine readable medium such that a user may present the optical machine readable medium to the scanner. The merchant system may receive the scan of the optical machine readable medium from a scanner for a product and then put the associated product in a cart, such as an e-cart, for the user to purchase as part of a transaction.

In some embodiments, the user device may display the information regarding the POS system conducting the broadcast, check stand number, beacon number, and/or other information helpful for a consumer to determine which transaction the transaction identifier pertains to. For example, the user device may extract the check stand number from the received transaction identifier and display the check stand number for the transaction. In this manner, a user may be able to view the check stand number and determine whether the user device is interacting with the correct check stand and/or point of sales device. Similarly, other information may be displayed for the user to confirm that the user device has the correct transaction.

At process 602, the user device may determine the distance that the user device is from the broadcasting device. In some embodiments, the user device may measure the strength of the wireless signal broadcasting the transaction identifier and calculate the distance that the user device is from the broadcasting device based on the signal strength. For example, the user device may use the following equation for determining the distance in meters: distance=10^((27.55−(20*Log(frequency))+(signal strength))/20), where signal strength is measured in decibel-milliwatts. In some embodiments, signal strength may be used instead of distance or in combination with the distance. In some examples, the signal strength may be sent to a payment provider for receiving coupons, discounts, or sales information related to products near the broadcasting beacon. In some examples, the application may receive coupons, discounts, and/or other incentives from the beacon to display to the user when the distance and/or signal strength is within a certain threshold. When the application determines that the user device is within the threshold distance or receives a signal strength over a threshold value from the beacon, the incentives may be unlocked by the application and provided to the user for storage or use. In some embodiments, the incentives may be for products near the beacon, and the threshold distance and signal strength may be used to ensure that the user device, and therefore the user, is in visible range of the products related to the incentives. This way a user will not have to hunt for products related to the incentives. This may be a less annoying and more useful form of advertising than displaying advertisements or incentives for random products.

In some embodiments, the transaction identifier may include or be accompanied by a geolocation for the broadcasting device. The user device may then compare the geolocation of the user device with the broadcasting device to determine the distance between the two devices. The user device may determine its geolocation through a GPS, triangulation through cell tower communications, triangulation through beacon pings, other geolocating methods, or a combination thereof. In some embodiments, the distance between the user device and broadcasting device may be provided by the broadcasting device as discussed in process 503 in relation to FIG. 5. In some embodiments, the geolocation may be retrieved from a payment provider that the merchant system and user device is in communication with. The payment provider system may relay the geolocation information, which may be associated with the transaction identifier, from the merchant system to the payment provider.

At process 603, the user device may receive a user input indicating that the user desires to pay for the goods and/or services related to the transaction. In some embodiments, the indication may be a gesture, such as a waving gesture. The gesture may be detected by the user device through an accelerometer, gyroscope, high accuracy GPS device, and/or the like. For example, the user device may be configured to detect waving motions using an accelerometer by sensing alternating angular acceleration in opposing directions along an axis in quick successions. Similarly the user device may have a gyroscope to detect a waving motion by sensing a back and forth rotation of the device over an axis in quick successions. In some embodiments, the user device may use a high accuracy GPS device to detect a waving motion. For example the user device may use the high accuracy GPS device to track the position of the user device and detect whether the device moves back and forth in a waving like motion. In some embodiments, the user device may use a combination of the accelerometer, gyroscope, high accuracy GPS device, and/or other movement detection systems for determining whether the phone is performing a particular gesture.

In some embodiments, the user device may use a threshold value for determining that a gesture is a user input. For example, the threshold may be one or more of the following: a threshold acceleration speed, a threshold rotation amount, a threshold distance traveled, a threshold number of back and forth movement, and/or the like. In some embodiments, the user device may begin detecting for a gesture after a user action, such as a press of a button and/or providing of a biometric signature. Although the gesture detection and use are discussed herein in relation to the user device, as discussed above, gesture detection may be performed with the merchant system using beacons as well. The detection, recording, and communicating of the detected gestures, as discussed above, can all be conducted with and by the beacon in concert with a merchant system and/or payment system.

In some embodiments, the user device may distinguish normal random gestures, such as someone walking, running, or holding the user device while waving at a friend from gestures meant for obtaining a transaction identifier or conducting a purchase. For example, the gesture may be a specific type of movement or user specified movement that is unlikely to be performed unintentionally. For example, the gesture may be the gesture of signing a name while holding the phone or one or more tapping motions directed at the beacon.

In some embodiments, the user device may request the user to provide gestures meant for interactions with a payment system or beacon. Those gestures may be used by the user device or a remote server on communication with the user device as a training set to determine whether the user is conducting a gesture intended for interacting with a merchant system and/or payment system. In some embodiments, the user device or a remote server in communication with the user device may also have a training set of normal everyday movements of the user device and ensure the user gesture is sufficiently distinguished from those everyday movements. The user device may reject user provided gestures for interacting with a merchant system if the user device or remote server determines that the provided gestures are not sufficiently complex or cannot be repeated by the user reliably. Once a user provided gesture that is sufficiently complex and repeatable, the user device or a remote server in communication with the user device may then detect for gestures that match the user provided gesture. In some embodiments, the remote server may be a merchant system or payment system.

At process 604, the user device may determine user intent based on a dual factor mechanism such as the combination of a gesture (first factor) and a signal strength of the beacon broadcast (second factor). In some embodiments, the user device recognizes the gestures using an accelerometer to measure an acceleration of the user device. The device may determine whether an acceleration measurement is within a certain threshold value. In some embodiments, the signal strength may be the received signal strength indicator (RSSI) from a beacon that is measured by the user device. The user device may also determine whether the RSSI is within a certain threshold value. The user device may use the combination of the acceleration measurement and the RSSI to determine that the user has intended an action, such as when the acceleration and RSSI are within certain threshold values. Although the dual factor mechanism is described herein in relation to determining user intent for conducting a purchase, the intent may also be used for other systems. The benefit of this dual-factor intent determination mechanism is that a user using the user device may perceive the device as using a NFC system without the device actually using an NFC system. In some embodiments, the intent may be based on the calculated distance based on the beacon signal strength and a gesture measured using a different sensor, such as a gyroscope.

At process 605, the user device may determine that the intent of the user is to purchase goods and/or services with a user account. In response, the user device may send user account information and the transaction identifier to the payment system and request that the payment system purchase the products related to the transaction identifier in response to receiving the beacon broadcast at process 601 and the user input at process 603. The user account information may include an account name, password, an identifier of the user, identifier for the user device, and/or the like. In some examples the identifier of the user may be a biometric signature of the user, such as a finger print, photograph of the user, and/or any other biometric signature.

In some embodiments, the user device may implement a confirmation procedure to prevent the user device from completing a transaction unintentionally. In some examples, the user device may check to see if the distance determined at process 602 is within a threshold distance. For example, the threshold distance may be 1 meter. If the distance determined at process 602 is greater than the threshold distance, the user device may not send the user account information and the transaction identifier to the payment provider even though the user device detects a user input at process 603 indicating that the user would like to purchases the products for the transaction.

In some embodiments, the user input may include a confirmation indicator such as a failsafe or additional security measure for a false positive detection of a gesture for a user input intending to conduct a purchase or receive a transaction identifier. For example, the user device at process 601 may have received a plurality of broadcasts of transaction identifiers. The user device, as a failsafe, may display information related to several transactions. In some examples, the information related to each transaction may be displayed in response to the user gesture. In some examples the information may be an isle number, one or more items in the transaction, and/or other information identifying each respective transaction. The user device may provide actuatable elements or software buttons which the user may actuate to select one or more of the transactions. The actuatable elements may be actuated using an input device on the user device, such as a touchscreen.

In some embodiments, the user device may include an authentication step as part of the failsafe. For example, the user device may request a fingerprint or another biometric signature be provided by the user as part of or along with a gesture. In some examples, the user device may request account information, such as a password.

Figure 7:
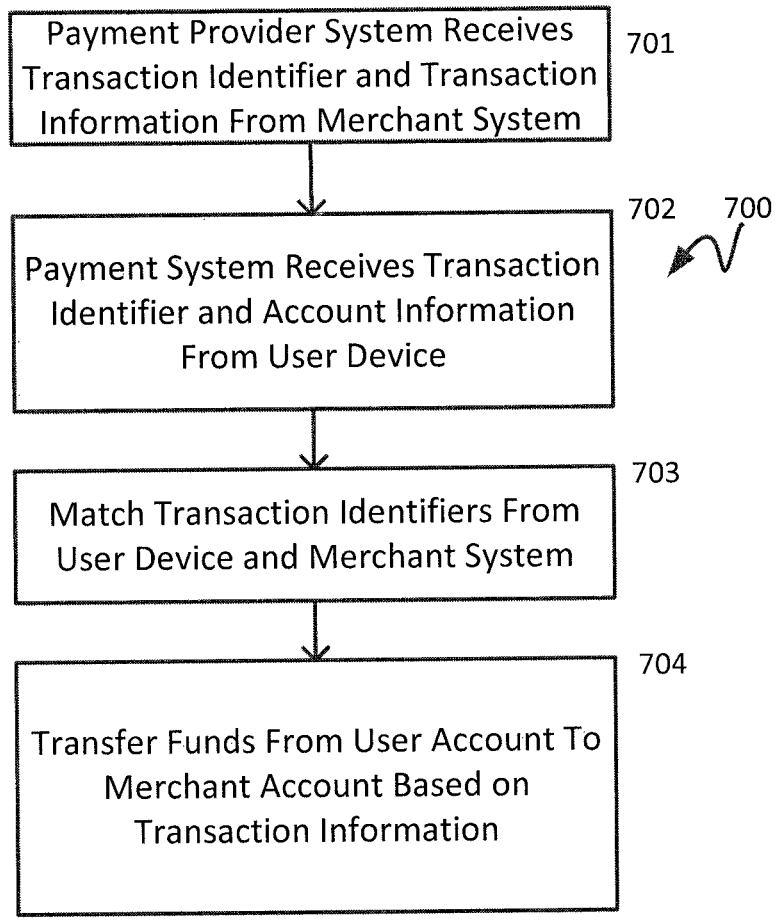
FIG. 7 is a simplified diagram of an exemplary method which may be implemented by a payment provider system as part of a secure transaction system using a wireless beacon.

FIG. 7 is a simplified diagram of a method 700 for secure transactions using a wireless beacon implemented by a payment provider system. In some embodiments, method 700 may be implemented by or part of a system such as system 100 of FIG. 1. According to some embodiments, method 700 may include one or more of the processes 701-704 which may be implemented, at least in part, in the form of executable code stored on a non-transitory, tangible, machine readable media that when run on one or more processors (e.g., the processor 212 of FIG. 2) may cause the one or more processors to perform one or more of the processes 701-704.

At process 701, the payment provider system may receive identifier for a transaction and transaction information from a merchant system. In some examples, the transaction identifier and transaction information may be the identifier and transaction information sent at process 504 of FIG. 5. In some embodiments, the payment provider may also receive merchant information, such as an identifier for one or more accounts for the merchant. In some embodiment, the payment provider system may communicate with the merchant system through a network, such as network 150 of FIG. 1. The information received from the merchant may be addressed to the payment provider system, such as an internet protocol address, and relayed from merchant system to the payment provider device.

In some embodiments, instead of receiving the identifier for a transaction, the payment provider may generate the identifier for the transaction. The generation of the identifier may be in response to an indication that the merchant system has started a new transaction and/or the receipt of transaction information from the merchant system.

At process 702, the payment provider system may receive a transaction identifier and account information from a user device. The payment provider system may also receive an identifier for identifying the user account, authentication information, the distance between the user device and a broadcasting device of the merchant system, broadcasting signal strength and/or the like. Similar to process 701, the payment provider system may communicate with the user device through a network, such as network 150 of FIG. 1. The information received from the user may be addressed to the payment provider system, such as an internet protocol address, and relayed from the user device to the payment provider device.

At process 703, the payment provider system may match the transaction identifier generated by the payment provider or received from the merchant system at process 701 with the transaction identifier from the user device at process 702. If a match is not found, the payment provider system may send an error message to the user device indicating that the transaction could not be found, expired, canceled, or already completed. In some embodiments, the payment provider may check to see if the transaction identifier is expired and send an error message to the user device when the transaction identifier has expired.

In some embodiments, the payment system may receive a transaction identifier from multiple user devices that match a transaction identifier from a merchant. In some examples, the payment provider system may resolve the multiple matches by conducting the transaction based on which user device the transaction information was received from first. In some embodiments, the payment system may resolve the multiple matches by conducting the transaction with the user device that is closest to the merchant broadcasting device. For example, the system may compare the distance data received in process 702 from the multiple devices.

In some embodiments, the payment provider system may relay/communicate transaction information received from the merchant associated with the transaction identifier to the user device.

In some embodiments, the payment system may relay or electronically communicate coupons, discounts, and other incentives to the user device based on the signal strength or distance the user device is from the beacon. For example, the payment system may communicate with the merchant system to determine which beacon sent the transaction identifier that the user device received. The merchant system may also provide the payment system information about discounts or advertisements for products for sale near the beacon for the payment system to relay to the user device.

At process 704, the payment provider system may transfer funds from the matching user account to the merchant account, the amount of funds being based on the transaction information. In some embodiments, the payment provider system may send a confirmation to the user and/or the merchant. The confirmation may be a message sent by email, SMS, and/or the like. The confirmation may include details about the transaction such as the transaction identifier, information about the transaction, the merchant account, user account, amount of funds transferred, time and day of the transaction, information about what was paid for, and/or the like. In some embodiments, process 704 may occur in response to a user sending a confirmation in reply to the transaction information sent to the user device in process 703.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Additionally, the above examples are described in relation to a payment provider system, user device, and a merchant system, however, these devices/systems may be interchangeable combined and/or merged such that some of the processes performed by each system may be performed by another system. In some embodiments, some of the system may be completely merged into another system such that the other does not exist, for example all of the function of the merchant system may be performed by and merged into the payment provider system. Although the methods discussed in FIGS. 5-7 are discussed separately, the steps discussed in each of those methods may be interchanged with and/or added to each other. In some embodiments a single system may implement some or all of the steps discussed in FIGS. 5-7. For example, in some embodiments, the payment provider system may be a cloud service owned, leased, and/or operated by the merchant.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A secure transaction processing system comprising:
a wireless beacon;
a non-transitory memory; and
one or more hardware processors coupled to the non-transitory memory and the wireless beacon, and configured to read instructions from the non-transitory memory to cause the system to perform operations comprising:
associating a transaction at a point of sale system of a merchant with a transaction identifier;
in response to the associating, determining motion information based on changes in signal strength of a signal provided by a user device and detected by the wireless beacon at intervals;
detecting a first gesture of the user device based on the motion information; determining the first gesture of the user device corresponds with a trained gesture associated with the user device;
in response to the first gesture of the user device corresponding with the trained gesture, sending a broadcast that includes the transaction identifier using the wireless beacon to the user device;
providing transaction information of the transaction and the transaction identifier to a payment provider device over a network; and
receiving, from the payment provider device over the network, an indication that the transaction was completed using the transaction identifier.

2. The system of claim 1, wherein the transaction identifier has an expiration.

3. The system of claim 2, wherein the transaction associated with the transaction identifier is terminated when the transaction identifier expires.

4. The system of claim 1, wherein the system dynamically changes a signal strength of the broadcast by the wireless beacon based on an estimated number of consumers.

5. The system of claim 1, wherein a point of sales identifier is broadcasted with the transaction identifier using the wireless beacon.

6. The system of claim 1, wherein the operations further comprise:
providing a receipt electronically to the user device for the completed transaction.

7. The system of claim 1, wherein the operations further comprise:
dynamically changing a signal strength of the broadcast in response to receiving an indication of a number of user devices attempting to use the same transaction identifier.

8. The system of claim 1, wherein the operations further comprise:
causing the user device to display information about the transaction on a display of the user device.

9. A method of performing a secure transaction, comprising:
associating, by a merchant system that includes a wireless beacon, a transaction at a point of sale system of a merchant with a transaction identifier;
in response to the associating, determining, by the merchant system, motion information based on changes in signal strength of a signal provided by a user device and detected by the wireless beacon at intervals;
detecting, by the merchant system, a first gesture of the user device based on the motion information;
determining, by the merchant system, the first gesture of the user device corresponds with a trained gesture associated with the user device;
in response to the first gesture of the user device corresponding with the trained gesture, sending, by the merchant system, a broadcast that includes the transaction identifier using the wireless beacon to the user device;
providing, by the merchant system, transaction information of the transaction and the transaction identifier to a payment provider device over a network; and
receiving, by the merchant system from the payment provider device over the network, an indication that the transaction was completed using the transaction identifier.

10. The method of claim 9, further comprising:
terminating, by the merchant system, the transaction associated with the transaction identifier when the transaction identifier expires based on an expiration time associated with the transaction identifier.

11. The method of claim 9, wherein a signal strength of the broadcast by the wireless beacon dynamically changes based on an estimated number of consumers.

12. The method of claim 9, wherein a point of sales identifier is broadcasted with the transaction identifier using the wireless beacon.

13. The method of claim 9, further comprising:
providing, by the merchant system, a receipt electronically to the user device for the completed transaction.

14. The method of claim 9, further comprising:
dynamically changing, by the merchant system, a signal strength of the broadcast in response to receiving an indication of a number of user devices attempting to use the same transaction identifier.

15. A non-transitory machine-readable medium having stored thereon machine readable instructions executable to cause a machine to perform operations comprising:
associating a transaction at a point of sale system of a merchant with a transaction identifier;
in response to the associating, determining motion information based on changes in signal strength of a signal provided by a user device and detected by a wireless beacon at intervals;
detecting a first gesture of the user device based on the motion information;
determining the first gesture of the user device corresponds with a trained gesture associated with the user device;
in response to the first gesture of the user device corresponding with the trained gesture, sending a broadcast that includes the transaction identifier using the wireless beacon to the user device;
providing transaction information of the transaction and the transaction identifier to a payment provider device over a network; and
receiving, from the payment provider device over the network, an indication that the transaction was completed using the transaction identifier.

16. The non-transitory machine-readable medium of claim 15, wherein the operations further comprise:
terminating the transaction associated with the transaction identifier when the transaction identifier expires based on an expiration time associated with the transaction identifier.

17. The non-transitory machine-readable medium of claim 15, wherein a signal strength of the broadcast by the wireless beacon dynamically changes based on an estimated number of consumers.

18. The non-transitory machine-readable medium of claim 15, wherein a point of sales identifier is broadcasted with the transaction identifier using the wireless beacon.

19. The non-transitory machine-readable medium of claim 15, wherein the operations further comprise:
   providing a receipt electronically to the user device for the completed transaction.

20. The non-transitory machine-readable medium of claim 15, wherein the operations further comprise:
   dynamically changing a signal strength of the broadcast in response to receiving an indication of a number of user devices attempting to use the same transaction identifier.

* * * * *